United States Patent Office 3,471,505
Patented Oct. 7, 1969

3,471,505
1-(ALKOXYPHENYL)-1-(3-PYRIDYL)-CARBINOLS
William Laszlo Bencze, New Providence, N.J., assignor to Ciba Corporation, New York, N.Y., a corporation of Delaware
No Drawing. Continuation-in-part of application Ser. No. 339,106, Jan. 21, 1964. This application Feb. 1, 1967, Ser. No. 613,089
Int. Cl. C07d 31/28; A61k 27/00
U.S. Cl. 260—297                    4 Claims

ABSTRACT OF THE DISCLOSURE

The diaryl-carbinol of the Formula I

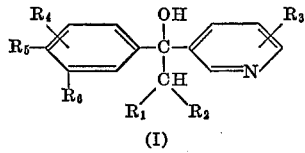

$R_1$, $R_2$ = methyl or ethyl
$R_3$, $R_4$ = H, methyl or ethyl
one of
$R_5$, $R_6$ = alkoxy with up to 4C
other = H its N-oxide, lower alkanoic acid esters and acid addition salts thereof, particularly the 1-(4-methoxy-phenyl)-1-(3-pyridyl)-1-i-propyl-carbinol, exhibit properties similar to those of metyrapone.

CROSS-REFERENCES

This is a continuation-in-part of application Ser. No. 339,106, filed Jan. 21, 1964, now abandoned, which in turn is a continuation-in-part of application Ser. No. 132,005, filed Aug. 17, 1961, now abandoned, which in turn is a continuation-in-part of application Ser. No. 6,360, filed Feb. 3, 1960, now abandoned.

SUMMARY

The present invention concerns and has for its object the provision of new diaryl-carbinols, more particularly those of Formula I, in which each of $R_1$ and $R_2$ stands for methyl or ethyl, each of $R_3$ and $R_4$ for hydrogen, methyl or ethyl, one of $R_5$ and $R_6$ for alkoxy with up to 4-carbon atoms and the other for hydrogen, their N-oxide and lower alkanoic acid esters, and the acid addition salts of these compounds, as well as to corresponding pharmaceutical compositions.

DESCRIPTION

Of the groups $R_1$ and $R_2$ preferably one stands for methyl and the other for methyl or ethyl.

Both of the groups $R_3$ and $R_4$ preferably stand for hydrogen, but may also be methyl or ethyl in one of the remaining 4 positions of the respective nuclei.

Of the groups $R_5$ and $R_6$ the latter preferably represents hydrogen and the former preferably methoxy, but also ethoxy, n- or i-propoxy or -butoxy.

Lower alkanoic acid esters of the diaryl-carbinols of Formula I are, for example, those derived from acetic, propionic, butyric or pivalic acid.

The compounds of the invention exhibit valuable pharmacological properties, for example, such known from metyrapone. Thus, the compounds of the invention interfere with the steroidogenesis in the adrenal cortex by inhibiting the 11β-hydroxylation. They are, therefore, useful as diagnostic tools to detect, for example, hypopituitarism and Cushing's syndrome.

Particularly useful are the compound of Formula II

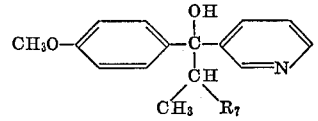

in which $R_7$ stands for methyl or ethyl, and their therapeutically useful acid addition salts which, when given to dogs at 5.0 mg./kg. i.v., show 10 to 60 minutes after application a drop of the cortisol content and an increase of the 11-desoxycortisol content of the blood, which effect is of shorter duration as that caused by the same dose metyrapone.

The compounds of the invention are prepared by methods known per se, for example, by the action of the Grignard compound X—Mg—Hal on the ketone Y—CO—Z in which one of X, Y and Z stands for

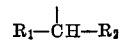

the other for

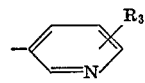

and the third for

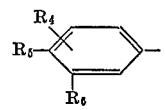

and Hal advantageously for bromo, hydrolyzing the resulting magnesium complex and, if desired, converting a resulting compound into its N-oxide and/or its O-alkanoyl derivative and/or an acid addition salt thereof and/or separating a resulting mixture of isomers into the single isomers.

An N-oxide is prepared, for example, by treating a solution of the resulting compound in a suitable solvent with an N-oxidizing reagent, such as, for example, ozone, hydrogen peroxide, an inorganic peracid, e.g. persulfuric acid, an organic persulfonic acid, e.g. p-toluene persulfonic acid or an organic percarboxylic acid, e.g. peracetic acid, perbenzoic acid or monoperphthalic acid.

An O-alkanoyl derivative is obtained, for example, by reacting the alcohol with a reactive functional derivative of an alkanoic acid, such as its anhydride or halide, e.g. chloride.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, such as hydrohalic, e.g. hydrochloric or hydrobromic acid, sulfuric, phosphoric, nitric or perchloric acid, aliphatic, alicyclic, aralipathic, aromatic or heterocyclic carboxlyic or sulfonic acids, such as formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

Resulting mixtures of isomeric compounds are separated into the isomers on the basis of physico-chemical differences, for example, by fractional crystallization, fractional distillation or chromatography. Racemates are resolved into the optically active antipodes, for example, with the use of one of the optically active forms of an acid having an asymmetric carbon atom such as d- or l-tartaric, dibenzoyl-tartaric, di-p-toluyl-tartaric, malic, mandelic, 10-camphor sulfonic or quinic acid.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature, or elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the reactions of the invention that lead to the formation of those compounds indicated above as being specially valuable.

The starting material used is known or, if new, may be prepared according to known methods, such as the Friedel-Crafts procedure.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

Example 1

A solution of 3.69 g. of isopropyl bromide in 20 ml. of diethyl ether is slowly added to 0.72 g. of magnesium in 25 ml. of diethyl ether; the reaction mixture is refluxed until the magnesium has disappeared. A solution of 6.39 g. of 4-methoxy-phenyl 3-pyridyl ketone in 25 ml. of diethyl ether is added while cooling and stirring. The mixture is subsequently refluxed for 2 hours while stirring, allowed to stand overnight at room temperature, and then poured onto a mixture of ice and concentrated aqueous hydrochloric acid. The organic layer is separated and discarded; the aqueous phase is brought to pH=5 with an aqueous solution of sodium hydroxide. The resulting orange, crystalline precipitate is collected, dried (yield: 3.07 g.) and recrystallized twice from a mixture of ethanol and water. The desired 1-(4-methoxy-phenyl)-2-methyl-1-(3-pyridyl)-propanol of the formula

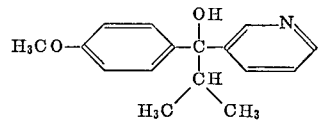

melts at 129–130°.

Upon treatment with acetic acid anhydride in the presence of pyridine, the O-acetyl-1-(4-methoxy-phenyl-2-methyl-1-(3-pyridyl)-propanol is obtained.

The starting material is prepared as follows: A solution of 61.5 g. of nicotinic acid in 250 ml. of thionyl chloride is heated for 2 hours; the excess of thionyl chloride is distilled off under reduced pressure and replaced by 150 ml. of anisole. Part of the anisole is removed under reduced pressure, and an additional 150 ml. of anisole is added, and a total of 165 g. of aluminum chloride is given to the solution in portions while maintaining external cooling. The ice bath is then removed, the orange mixture is heated to 50–60° for 2 hours and is then poured onto a mixture of ice and concentrated aqueous hydrochloric acid. The aqueous acidic layer is extracted twice with diethyl ether, the anisole layer and the other extracts are combined and extracted with a 1:1-mixture of water and concentrated aqueous hydrochloric acid. The acidic extract is combined with the original aqueous acidic layer. The combined acidic solution is neutralized with 50% aqueous sodium hydroxide and extracted three times with chloroform. The organic extracts are washed, dried over sodium sulfate, filtered and evaporated to dryness under reduced pressure to leave 107 g. of a brown solid residue. The latter is dissolved in benzene, the resulting solution is treated with activated charcoal, filtered and diluted with pentane. The resulting precipitate is collected and dissolved in hot ethanol; upon cooling the crystalline 4-methoxy-phenyl 3-pyridyl ketone precipitates and is filtered off, M.P. 99–99.5°.

Example 2

To the Grignard reagent, prepared from 13.7 g. of secondary butyl bromide in 20 ml. of diethyl ether and 2.4 g. of magnesium in 15 ml. of diethyl ether, is added slowly and while stirring a solution of 10.0 g. of 4-methoxy-phenyl 3-pyridyl ketone in 40 ml. of benzene. The reaction mixture is refluxed for a total of 3 hours, cooled with ice and treated with 25 ml. of a concentrated aqueous solution of ammonium chloride. The mixture is diluted with 100 ml. of water, the organic layer is separated, the aqueous phase is washed with chloroform and the combined organic solutions are washed with water and dried over sodium sulfate. The solvents are evaporated, and the residue is distilled to yield 9.0 g. of 1-(4-methoxy-phenyl)-2-methyl-1-(3-pyridyl)-butanol of the formula

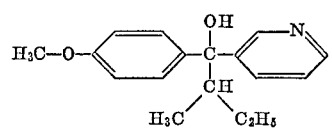

as a yellow, viscous oil, B.P. 147–152°/0.08 mm.

When reacted with hydrogen peroxide in methanol and destroying the excess of hydrogen peroxide with palladium on charcoal, the 1-(4-methoxy-phenyl)-2-methyl-1-(3-pyridyl)-butanol-N-oxide is obtained.

Example 3

According to the method described in the previous examples, the following compounds are prepared from equivalent amounts of the corresponding starting material: the 1-(3-methoxy-phenyl)-2-methyl-1-(3-pyridyl)-propanol, the 1-(4-ethoxy-phenyl)-2-methyl-1-(3-pyridyl)-propanol, the 1-(4-methoxy-phenyl)-2-ethyl-1-(3-pyridyl)-butanol, the 1-(3-methyl-5-methoxy-phenyl)-2-methyl-1-(5-methyl-3-pyridyl)-propanol and the 1-(4-methoxy-phenyl)-2-methyl-1-(4-methyl-3-pyridyl)-propanol.

I claim:

1. A member selected from the group consisting of the diaryl-carbinol having the formula

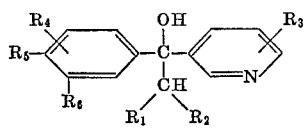

in which each of $R_1$ and $R_2$ is a member selected from the group consisting of methyl and ethyl, each of $R_3$ and $R_4$ is a member selected from the group consisting of hydrogen, methyl and ethyl, one of $R_5$ and $R_6$ is alkoxy with up to 4 carbon atoms and the other is hydrogen, its N-oxide, the lower alkanoic acid ester and an acid addition salt thereof.

2. A compound as claimed in claim 1, and being a member selected from the group consisting of the compound having the formula

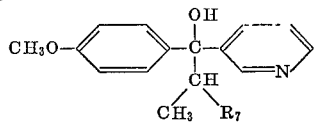

in which $R_7$ is a member selected from the group consisting of methyl and ethyl, and therapeutically useful acid addition salts thereof.

3. A compound as claimed in claim 1, and being the 1-(4-methoxy-phenyl)-2-methyl-1-(3-pyridyl)-propanol.

4. A compound as claimed in claim 1, and being the 1-(4-methoxy-phenyl)-2-methyl-1-(3-pyridyl)-butanol.

References Cited

UNITED STATES PATENTS 2,727,895  12/1955  Sperber et al. ____ 260—297 XR

OTHER REFERENCES

Tilford et al.: J. Am. Chem. Soc., vol. 70, pp. 4001–4008 (1948).

Culvenor: Rev. Pure and Applied Chem., vol. 3 (1953), pp. 83–86.

HENRY R. JILES, Primary Examiner

A. L. ROTMAN, Assistant Examiner

U.S. Cl. X.R.

260—294.8, 295, 295.5; 424—263, 266